July 26, 1960
S. R. HOPKINS
2,946,420
FASTENER INSERTING DEVICES
Filed March 19, 1958
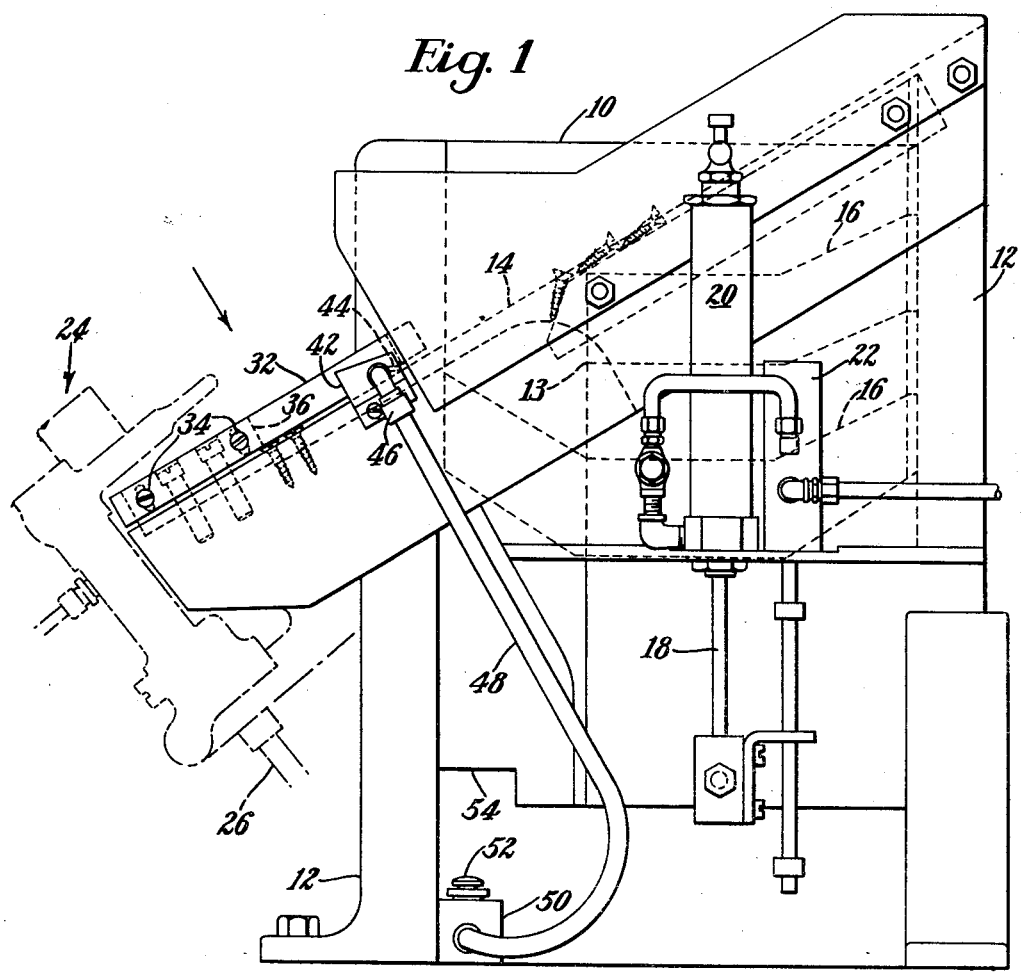
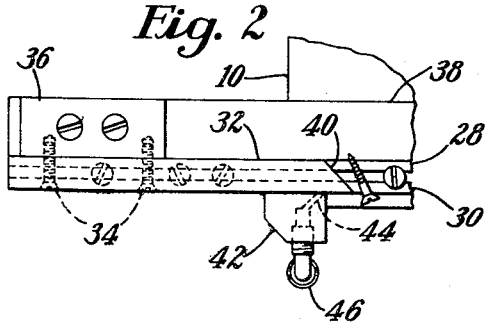
*Inventor*
Shirley R. Hopkins
By his Attorney
Richard A. Wise

United States Patent Office 2,946,420
Patented July 26, 1960

2,946,420
FASTENER INSERTING DEVICES

Shirley Russell Hopkins, Leicester, England, assignor to United Shoe Machinery Corporation, Flemington, N.J., a corporation of New Jersey Filed Mar. 19, 1958, Ser. No. 722,489

Claims priority, application Great Britain Apr. 25, 1957

8 Claims. (Cl. 193—43)

This invention relates to fastener handling and more particularly to machines which orient or align fasteners with respect to their ends and then feed the aligned fasteners one at a time to remotely located automatic inserting tools. A typical machine of this type includes mechanism for transferring fasteners from a hopper, in which they are placed in randomly oriented fashion, to a downwardly inclined raceway in which they slide, oriented with respect to their ends, to its lower end. At the lower end, there is mechanism for separating fasteners one at a time from the raceway and conveying them to a remotely located inserting tool.

This type of machine is generally provided with means for clearing and ejecting improperly oriented fasteners from the raceway before they reach its lower end or the point where they are individually separated. One such machine is shown in United States Letters Patent No. 2,819,465, issued January 14, 1958 to Donald B. McIlvin, in which the clearing and ejecting mechanism is a rotating wheel. While this wheel is effective in clearing jammed fasteners from the lower and middle portions of the raceway it is not effective in clearing fasteners jammed in the upper portion, i.e., remote from the area in which the ejector wheel and the separating mechanism are located.

It is, therefore, an object of this invention to provide a fastener handling machine of the type described above having mechanism effective in clearing from the entire length of the raceway fasteners not properly passing downwardly thereof.

It is another object of the present invention to provide a machine having a fastener clearing mechanism capable of accomplishing the above object which is not only inexpensive to construct but will operate automatically.

In accordance with these objects and as a feature of this invention there is provided a hopper for holding a supply of randomly oriented fasteners and means for elevating fasteners from the hopper to a downwardly inclined raceway. The fasteners slide downwardly in the raceway, becoming oriented with respect to their ends. Automatic means are provided for directing an intermittent blast of air to clear jammed or improperly aligned fasteners from the raceway. The means for directing the air blast includes a valve operated by and in timed sequence with the movement of the elevating mechanism. It supplies air to a jet which is directed upwardly of the raceway, i.e., opposing the downward direction of movement of the fasteners. An abutment is spaced above the raceway an amount sufficient to permit only uniformly oriented fasteners to pass down the raceway and has a deflecting surface engageable with improperly oriented fasteners or those which pass down the raceway askew to deflect them back into the hopper. The abutment and the air jet cooperate to dislodge improperly oriented fasteners from the raceway in the area adjacent the abutment and at all portions of the raceway thereabove and deflect them back into the hopper.

These and other features of the invention including various novel details of construction and combinations of parts will now be more particularly described with reference to the accompanying drawings and pointed out in the claims.

In the drawings;

Fig. 1 is a side elevation of a fastener handling machine embodying the present invention; and Fig. 2 is a silghtly enlarged view of the left-hand portion of the machine and taken in the direction of the arrow in Fig. 1.

The general organization of fastener handling machines embodying the invention is shown in Fig. 1. A hopper 10 for holding a supply of randomly oriented fasteners, such as nails, screws or the like, is secured to a main frame 12 which may be mounted on a bench or other suitable support. Forming one side of the hopper is an elevating mechanism 13 for lifting fasteners from the hopper and delivering them to a downwardly inclined slotted raceway 14 along which the fasteners slide in a uniformly aligned relationship suspended by their heads. The hopper, elevating mechanism and race way are identical with those disclosed in the above-mentioned McIlvin patent and are herein described only briefly. The elevating mechanism comprises a plurality of lift slides 16 connected by a rod 18 to an air motor 20 which is controlled by a valve 22 for reciprocating the slides vertically. Secured to the frame 12 and mounted at the lower end of the downwardly inclined raceway 14 is a separating and feeding mechanism 24 which separates the endmost fastener from those in the raceway and delivers it under pressure through a delivery tube 26 to an inserting tool, such as a pneumatic nail or screw driving gun, in response to a signal from the tool. The separating mechanism 24 is pneumatically operated, being connected to the same source of pressurized air as are the inserting tool and the motor 20 which operates the lift slides 16.

The raceway 14 comprises a pair of parallel plates 28 and 30 (Fig. 2) spaced apart a distance less than the diameter of the heads of the fasteners but greater than their shank diameters. The lift slides 16 elevate fasteners from the bottom of the hopper 10 and deliver them to the upper portion of the raceway 14, whereupon they become oriented by sliding downwardly of the raceway with their heads supported by the raceway plates and their shanks depending therebetween. A raceway cover member 32 is spaced above the lower portion of the raceway plates 28 and 30 an amount just sufficient to permit the heads of supported fasteners to pass therebelow. The member 32 is adjustably secured by screw and slot connections 34 to a block 36 secured to a portion 38 of the machine frame. As seen in Fig. 1, the spacing between the upper surface of the raceway plates 28 and 30 and the raceway cover member 32 is such that properly oriented fasteners may slide down the raceway past the member 32 to the separating mechanism 24 while fasteners sliding down the raceway incorrectly aligned or lying askew relative to the raceway will be engaged by the end face 40 of the member 32 which forms an abutment for improperly oriented fasteners. The face 40 is formed on an angle of approximately 45° with the raceway which assists in deflecting improperly oriented fasteners back into the hopper 10 in a manner hereinafter to be described. The specific angle of the face 40 is not critical however.

Secured to the raceway plate 30 adjacent the upper end of the cover member 32 is a block 42 in which is formed an air passageway 44. Threaded in the block 42 and communicating with the passageway 44 is a fitting 46 which is connected to an air supply pipe 48 leading from a valve 50. The valve 50 communicates with a source of compressed air and includes a plunger 52 positioned directly below a cutaway portion 54 of one of the lift slides 16. The plunger 52 which acts against a spring (not shown) within the valve operates alternately to open and close the valve 50 permitting compressed air to flow in pulses through the air supply pipe 48 to the air passageway 44 each time the lift slides are reciprocated.

The passageway 44 is formed in the block 42 substantially normal to the end of the abutment surface 40 of the cover member 32 and is arranged to direct a blast of air at an acute angle with the upper surfaces of the raceway plates 28 and 30, these plates being inclined, as seen in Fig. 1, and the passageway 44 being substantially horizontal. The cooperative arrangement between the passageway 44 and the raceway is such that part of the air flowing from the passageway 44 passes between the plates 28 and 30 toward their upper end. Some of the air also flows from under the lower surface of the member 32 and over the plates 28 and 30 toward the hopper 10 causing any fastener resting on the upper surface of the raceway plates or against the abutment face 40 to be deflected back into the hopper. All of the air, however, flows in a direction which is in opposition to the normal downward direction of movement of fasteners in the raceway.

As the lift slides begin to move upwards, the cut out portion 54 moves out of contact with the plunger 52 permitting the valve 50 to close whereupon the air flowing through the passageway 40 ceases. As the lift slides reach the top of their stroke, fasteners are delivered to the upper portion of the raceway and proceed to slide downwardly thereof, the vast majority of the fasteners passing in oriented fashion beneath the lower surface of the member 32. However, improperly oriented fasteners engage the face 40 and are deflected back into the hopper 10. Any fastener not so returned to the hopper may impede the movement of properly oriented fasteners. Furthermore, improperly oriented fasteners may also jam in the upper portion of the raceway remote from the face 40, as for example, temporarily lodged against a piece of dirt or metallic chip between the raceway plate. As the lift slides again reach the bottom of their stroke, a blast of air is again directed through the passageway 44 causing any fasteners which have not been deflected back into the hopper 10 by the face 40 to do so. At the same time, some of the air travels up the raceway between the plates 28 and 30 and any fasteners jammed in the upper portion of the raceway remote from the face 40 become dislodged, some times sufficiently to be returned to the hopper and some times to be enabled to slide downwardly toward the separating mechanism when the blast ceases, either of which is a desirable result.

Having thus described my invention, what I claim as new and desire to secure by Letters Patent of the United States is:

1. In an apparatus for transferring headed fasteners and the like, an inclined raceway for supporting fasteners for downward sliding movement with their heads uniformly oriented with respect to each other, and means for rejecting improperly oriented fasteners from said raceway including means for directing a flow of air opposite to the movement of said fasteners.

2. In an apparatus for transferring headed fasteners and the like, an inclined raceway for supporting fasteners for downward sliding movement with their heads uniformly oriented with respect to each other, means for rejecting improperly oriented fasteners from said raceway including a jet located adjacent the lower portion of said raceway for directing a flow of air opposite to the movement of said fasteners, and means for delivering an intermittent flow of air to said jet.

3. In an apparatus for transferring headed fasteners and the like, an inclined raceway for supporting fasteners for downward sliding movement with their heads uniformly oriented with respect to each other, means for rejecting improperly oriented fasteners from said raceway including an abutment spaced above said raceway an amount sufficient to permit only uniformly oriented fasteners to pass down said raceway, said abutment being engageable with improperly oriented fasteners, and means for directing a flow of air opposite to the direction of movement of the fasteners to remove said improperly oriented fasteners from engagement with said abutment.

4. In an apparatus for transferring headed fasteners and the like, an inclined raceway for supporting fasteners for downward sliding movement with their heads uniformly oriented with respect to each other, means for rejecting improperly oriented fasteners from said raceway including an abutment spaced above said raceway an amount sufficient to permit only uniformly oriented fasteners to pass down said raceway, said abutment having a surface disposed at an acute angle with said raceway and engageable with improperly oriented fasteners to deflect them out of said raceway, and means for directing a flow of air opposite to the direction of movement of the fasteners to remove said improperly oriented fasteners from engagement with said abutment.

5. In an apparatus for transferring headed fasteners and the like, an inclined raceway for supporting fasteners for downward sliding movement including a pair of spaced plates having surfaces engageable with the head of a fastener, means to deliver fasteners to the upper portion of the raceway whereupon they slide downwardly of the raceway supported by their heads with their shanks depending between said plates, and means to reject improperly oriented fasteners from said raceway comprising means to direct a blast of air intermittently upwardly between said raceway plates to dislodge fasteners not properly progressing downwardly thereof.

6. In an apparatus for transferring headed fasteners and the like, an inclined raceway for supporting fasteners for downward sliding movement including a pair of spaced plates having surfaces engageable with the head of a fastener, means to deliver fasteners to the upper portion of the raceway whereupon they slide downwardly of the raceway supported by their heads with their shanks depending between said plates, and means to reject improperly oriented fasteners from said raceway comprising means to direct a blast of air intermittently across and upwardly between said raceway plates to dislodge improperly oriented fasteners therefrom.

7. In an apparatus for transferring headed fasteners and the like, an inclined raceway for supporting fasteners for downward sliding movement including a pair of spaced plates having surfaces engageable with the head of a fastener, means to deliver fasteners to the upper portion of the raceway whereupon they slide downwardly of the raceway supported by their heads with their shanks depending between said plates, and means to reject improperly oriented fasteners from said raceway comprising an abutment spaced above the lower portion of said raceway an amount sufficient to permit only properly oriented fasteners to pass therebeneath and having a surface engageable with improperly oriented fasteners to deflect them out of said raceway, means providing an air passageway having an opening in communication with the space between the abutment and the raceway and disposed in a direction opposing the downward movement of said fasteners, and means for delivering an intermittent flow of air to said passageway to disengage fasteners jammed in said raceway and engaged with said abutment.

8. In an appaartus for transferring headed fasteners and the like, an inclined raceway for supporting fasteners for downward sliding movement including a pair of spaced plates having surfaces engageable with the head of a fastener, means to deliver fasteners to the upper portion of the raceway whereupon they slide downwardly of the raceway supported by their heads with their shanks depending between said plates, and means to reject improperly oriented fasteners from said raceway comprising an abutment spaced above the lower portion of said raceway an amount sufficient to permit only properly oriented fasteners to pass therebeneath, said abutment having a surface engageable with improperly oriented fasteners to deflect them out of said raceway, means providing an air passageway having an opening in communication with the space between the abutment and the raceway and disposed in a direction opposing the downward movement of said fasteners, means for delivering air to said passageway to disengage fasteners jammed in said raceway and engaged with said abutment, and a valve operated by said fastener delivery means for directing an intermittent flow of air to said passageway.

References Cited in the file of this patent

UNITED STATES PATENTS

| | | |
|---|---|---|
| 12,975 | Terry | May 29, 1855 |
| 195,075 | Ashworth | Sept. 11, 1877 |
| 2,410,037 | Abbott | Oct. 29, 1946 |
| 2,560,737 | Palmer | July 17, 1951 |
| 2,661,099 | Falconer | Dec. 1, 1953 |